United States Patent
Tomoda

(10) Patent No.: US 12,236,985 B1
(45) Date of Patent: Feb. 25, 2025

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Yusuke Tomoda, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/424,186

(22) Filed: Jan. 26, 2024

(30) Foreign Application Priority Data

Sep. 12, 2023 (JP) ................................ 2023-147532

(51) Int. Cl.
*G11B 5/55* (2006.01)

(52) U.S. Cl.
CPC ................. *G11B 5/5539* (2013.01)

(58) Field of Classification Search
None
See application file for complete search history.

(56) References Cited

U.S. PATENT DOCUMENTS

| | | | |
|---|---|---|---|
| 3,956,736 A * | 5/1976 | Jacques | G11B 27/3027 |
| 6,445,525 B1 | 9/2002 | Young | |
| 7,133,241 B2 | 11/2006 | Che et al. | |
| 8,908,310 B1 | 12/2014 | Bai et al. | |
| 9,007,710 B1 * | 4/2015 | Liu | G11B 20/1217 360/48 |
| 9,036,284 B1 | 5/2015 | Feldman | |
| 9,361,944 B1 * | 6/2016 | Aoki | G11B 5/012 |
| 10,073,735 B1 * | 9/2018 | Cai | G06F 11/1048 |
| 2002/0024923 A1 * | 2/2002 | Ohno | G11B 27/329 |
| 2006/0039246 A1 * | 2/2006 | King | G11B 20/1883 369/30.01 |
| 2013/0063836 A1 * | 3/2013 | Bui | G11B 5/584 |
| 2022/0068307 A1 * | 3/2022 | Fujimoto | G11B 19/045 |
| 2022/0301590 A1 * | 9/2022 | Furuhashi | G11B 20/1833 |

* cited by examiner

*Primary Examiner* — Peter Vincent Agustin
(74) *Attorney, Agent, or Firm* — Maier & Maier, PLLC

(57) ABSTRACT

According to one embodiment, a magnetic disk device includes a disk, a write head, an adjustment unit, and a write processing unit. The adjustment unit adjusts each of a first adjustment value, a second adjustment value, and a third adjustment value. The write processing unit can select shingled magnetic recording and perform write processing based on the first to third adjustment values. When the number of the plurality of tracks of the band is t+1 and the number of unused sectors among the plurality of sectors of the band is e. The adjustment unit adjusts the first to third adjustment values to establish ext.

9 Claims, 7 Drawing Sheets

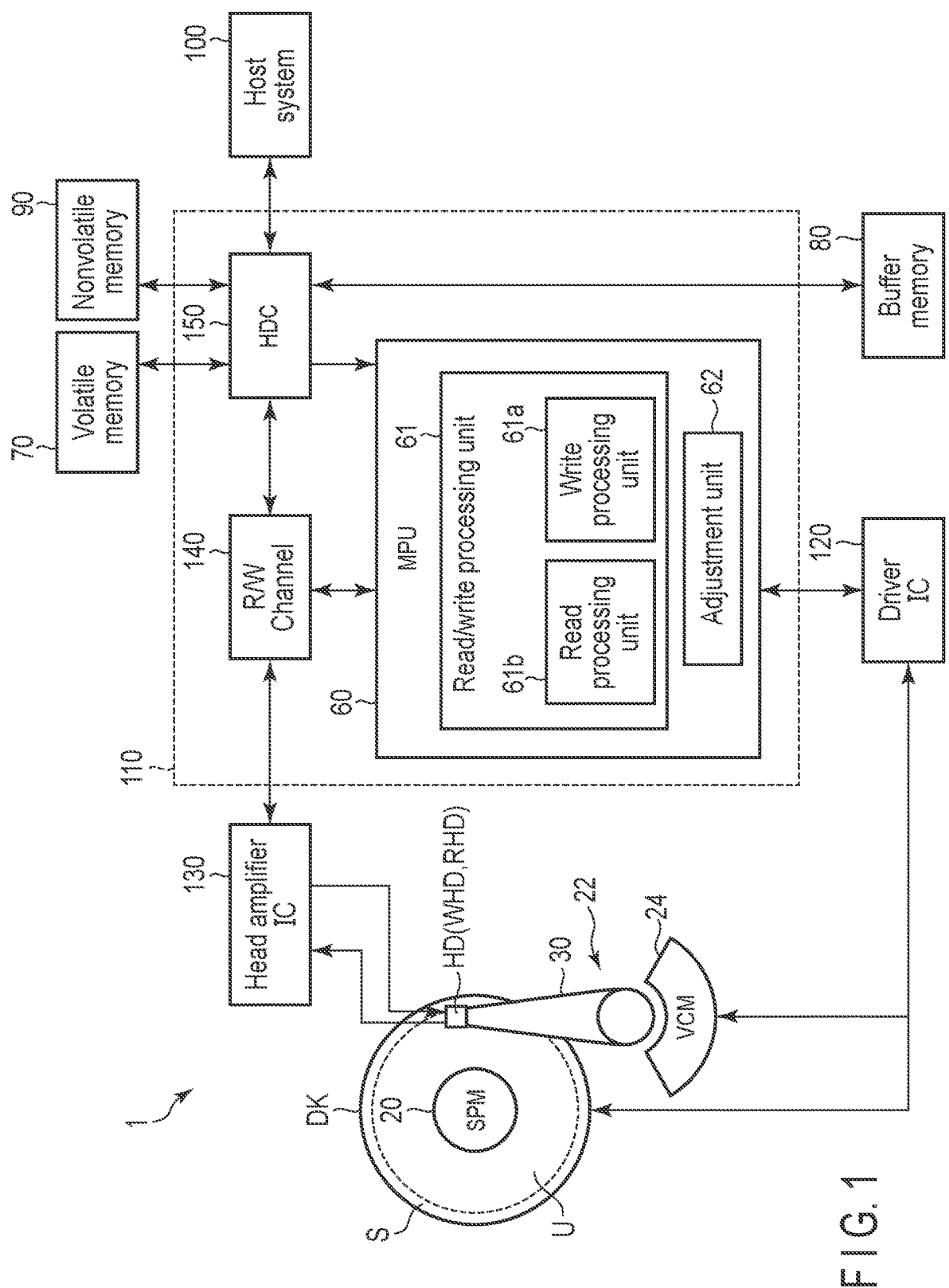
F I G. 1

MAGNETIC DISK DEVICE

CROSS-REFERENCE TO RELATED APPLICATIONS

This application is based upon and claims the benefit of priority from Japanese Patent Application No. 2023-147532, filed Sep. 12, 2023, the entire contents of which are incorporated herein by reference.

FIELD

Embodiments described herein relate generally to a magnetic disk device.

BACKGROUND

Magnetic disk devices such as a Conventional Magnetic Recording (CMR) (or conventional recording) magnetic disk device that writes data to a plurality of tracks arranged at intervals in the radial direction of the disk, a Shingled Magnetic Recording (SMR) or Shingled Write Recording (SWR) magnetic disk device that overwrites data to a plurality of tracks in the radial direction of the disk, and a hybrid recording type magnetic disk device that selectively executes the conventional magnetic recording and the shingled magnetic recording, are known.

BRIEF DESCRIPTION OF THE DRAWINGS

FIG. 1 is a block diagram showing a configuration of a magnetic disk device according to an embodiment.

DETAILED DESCRIPTION

Figure 2:
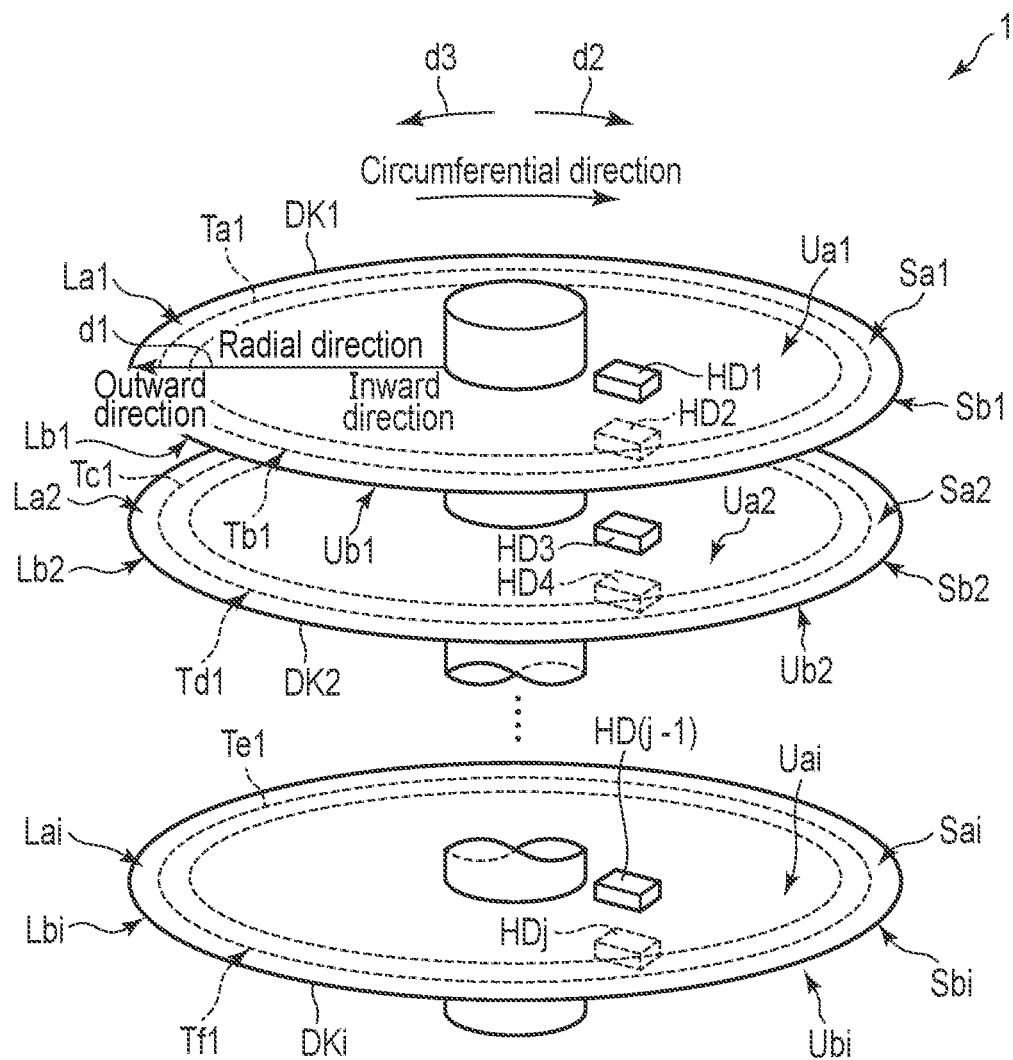
FIG. 2 is a perspective view showing parts of the magnetic disk device, illustrating a plurality of disks and a plurality of heads.

In general, according to one embodiment, there is provided a magnetic disk device comprising: a disk including a band including a plurality of tracks, each of the tracks including a plurality of sectors; a write head writing data to the disk; an adjustment unit adjusting each of a first adjustment value that is the number of the plurality of sectors in each of the tracks of the band, a second adjustment value that is a length of each of the sectors in a circumferential direction of the disk, and a third adjustment value that is the number of the plurality of tracks of the band; and a write processing unit capable of selecting shingled magnetic recording processing of overwriting data to the plurality of tracks in a radial direction of the disk and performing write processing based on the first to third adjustment values, wherein when the number of the plurality of tracks of the band is t+1 and the number of unused sectors among the plurality of sectors of the band is e, the adjustment unit adjusts the first to third adjustment values to establish ext.

According to another embodiment, there is provided a magnetic disk device comprising: a disk including a band including a plurality of tracks, each of the tracks including a plurality of sectors; a write head writing data to the disk; an adjustment unit adjusting each of a first adjustment value that is the number of the plurality of sectors in each of the tracks of the band, and a second adjustment value that is a length of each of the sectors in a circumferential direction of the disk; and a write processing unit capable of selecting shingled magnetic recording processing of overwriting data to the plurality of tracks in a radial direction of the disk and performing write processing based on the first and second adjustment values, wherein when a recording capacity of the band is Cb, a recording capacity of each of the sectors is Cs, the number of the plurality of sectors in each of the tracks of the band is n, the number of the plurality of tracks of the band is t+1, a variable is k, and the number of unused sectors among the plurality of sectors of the band is e, $Cb/Cs=n \times t+k$, and $n=e+k$, and the adjustment unit obtains information on the Cb, the Cs, and the t, and finalizes each of the n, the e, and the k to establish ext.

Embodiment

A magnetic disk device 1 according to one embodiment will be described hereinafter with reference to the accompanying drawings. First, a configuration of the magnetic disk device 1 will be described. FIG. 1 is a block diagram showing the configuration of a magnetic disk device 1 according to the embodiment. In the embodiment, the magnetic disk device 1 is a hybrid recording magnetic disk device that selectively executes the conventional magnetic recording and the shingled magnetic recording. However, technologies to be described below may be applied to the shingled recording magnetic disk device.

As shown in FIG. 1, the magnetic disk device 1 comprises a plurality of, for example, one to ten disks (magnetic disks) DK serving as recording media, a spindle motor (SPM) 20 serving as a drive motor, a head stack assembly 22, a driver IC 120, a head amplifier integrated circuit (hereinafter referred to as a head amplifier IC or preamplifier) 130, a volatile memory 70, a buffer memory (buffer) 80, a non-volatile memory 90, and a system controller 110 that is a single-chip integrated circuit. In addition, the magnetic disk device 1 is connected to a host system (hereinafter simply referred to as a host) 100.

Each disk DK is formed to have a diameter of, for example, 95 mm (3.5 inches) and has recording layers (magnetic recording layers) on both sides. In the present embodiment, the magnetic disk device 1 comprises one to ten disks DK, but the number of disks DK is not limited to this. Alternatively, the magnetic disk device 1 may comprise a single disk DK.

The head stack assembly 22 can control a head HD mounted on an arm 30 to move. i.e., seek to a target position on the disk DK by driving a voice coil motor (hereinafter referred to as VCM) 24.

A user data area U that can be used by the user and a system area S where information necessary for the system management is written are assigned to the area of the disk DK where the data can be written.

The head HD records and reproduces information on the disk DK. The head HD comprises a slider as a main body, and comprises a write head WHD and a read head RHD mounted on the slider. The write head WHD writes the data to the recording layer of the disk DK. The read head RHD reads the data from data tracks of the recording layer of the disk DK.

The driver IC 120 controls driving the SPM 20 and the VCM 24 under control of the system controller 110 (more specifically, MPU 60 to be described later). The SPM 20 supports and rotates a plurality of disks DK.

The head amplifier IC 130 comprises a read amplifier and a write driver. The read amplifier amplifies a read signal read from the disk DK and outputs the amplified read signal to the system controller 110 (more specifically, a read/write (R/W) channel 140 to be described later). The write driver outputs a write current corresponding to a signal output from the R/W channel 140 to the head HD.

The volatile memory 70 is a semiconductor memory where the stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The buffer memory 80 is a semiconductor memory which temporarily records data and the like transmitted and received between the magnetic disk device 1 and the host 100. Incidentally, the buffer memory 80 may be configured integrally with the volatile memory 70. The buffer memory 80 is, for example, a DRAM, a static random access memory (SRAM), an SDRAM, a ferroelectric random access memory (FeRAM), a magnetoresistive random access memory (MRAM), or the like.

The nonvolatile memory 90 is a semiconductor memory which records data stored even when power supply is cut off. The nonvolatile memory 90 is, for example, a NOR type or NAND type flash ROM (flash read only memory: FROM).

The system controller (controller) 110 is realized by using, for example, a large scale integrated circuit (LSI) referred to as a system-on-a-chip (SoC) in which a plurality of elements are integrated on a single chip. The system controller 110 includes a read/write (R/W) channel 140, a hard disk controller (HDC) 150, and a microprocessor (MPU) 60. The system controller 110 is electrically connected to the driver IC 120, the head amplifier IC 130, the volatile memory 70, the buffer memory 80, the nonvolatile memory 90, and the host 100.

The R/W channel 140 executes signal processing of read data transferred from the disk DK to the host 100 and write data transferred from the host 100 in accordance with instructions from the MPU 60 to be described later. The R/W channel 140 comprises a circuit or function of modulating the write data. In addition, the R/W channel 140 comprises a circuit or a function of measuring the signal quality of the read data. The R/W channel 140 is electrically connected to, for example, the head amplifier IC 130, the HDC 150, the MPU 60 and the like.

The HDC 150 controls data transfer between the host 100 and the R/W channel 140 in response to an instruction from the MPU 60 to be described later. The HDC 150 is electrically connected to, for example, the R/W channel 140, the MPU 60, the volatile memory 70, the buffer memory 80, the nonvolatile memory 90, and the like.

The MPU 60 is a control unit or main controller which controls each of units of the magnetic disk device 1. The MPU 60 controls the VCM 24 via the driver IC 120 to execute servo control for positioning the head HD. The MPU 60 controls the operation of writing the data to the disk DK and selects a storage destination of the write data transferred from the host 100. In addition, the MPU 60 controls the operation of reading the data from the disk DK and controls the processing of the read data transferred from the disk DK to the host 100. The MPU 60 is connected to each unit of the magnetic disk device 1. The MPU 60 is electrically connected to, for example, the driver IC 120, the R/W channel 140, the HDC 150 and the like.

The MPU 60 comprises a read/write processing unit 61, an adjustment unit 62, and the like. The MPU 60 executes the processing of these units, for example, the read/write processing unit 61, the adjustment unit 62, and the like on firmware. Incidentally, the MPU 60 may comprise each of these units as a circuit.

The read/write processing unit 61 includes a write processing unit 61a and a read processing unit 61b. The write processing unit 61a controls data write processing and the read processing unit 61b controls data read processing, in accordance with commands from the host 100. The read/write processing unit 61 controls the VCM 24 via the driver IC 120, positions the head HD at a target position (predetermined radial position) on the disk DK, and executes the read processing or the write processing.

FIG. 2 is a perspective view showing parts of the magnetic disk device 1, illustrating a plurality of disks DK and a plurality of heads HD.

As shown in FIG. 2, the rotation of direction of the disks DK in the circumferential direction is referred to as a rotational direction d3. In the example shown in FIG. 2, the rotational direction d3 is illustrated as a counterclockwise direction, but may be an opposite (clockwise) direction. In addition, a traveling direction d2 of the heads HD relative to the disks DK is opposite to the rotational direction d3. The traveling direction d2 is the direction in which the heads HD sequentially write the data to and read data from the disks DK in the circumferential direction, i.e., the direction in which the heads HD travel with respect to the disks DK in the circumferential direction.

The magnetic disk device 1 comprises i disks, from disk DK1 to disk DKi, and j heads, from head HD1 to head HDj. In the present embodiment, the number of heads HD is twice the number of disks DK (j=2×i).

The disks DK1 to DKi are provided coaxially to overlap with each other at intervals. The diameters of the disks DK1 to DKi are the same as each other. The terms "same", "identical", "matching", "equivalent" and the like imply not only the meaning of being exactly the same, but also the meaning of being different to the extent that they are considered substantially the same. Incidentally, the diameters of the disks DK1 to DKi may be different from each other.

Each disk DK has recording layers L on both sides. For example, the disk DK1 has a first recording layer La1 and a second recording layer Lb1 on the side opposite to the first recording layer La1. The disk DK2 has a first recording layer La2 and a second recording layer Lb2 on the side opposite to the first recording layer La2. The disk DKi has a first recording layer Lai and a second recording layer Lbi on the side opposite to the first recording layer Lai. Each first recording layer La may be referred to as a front surface or a recording surface. Each second recording layer Lb may be referred to as a back surface or a recording surface.

Each recording layer L includes the user data area U and the system area S. The first recording layer La1 includes a user data area Ua1 and a system area Sa1. The second recording layer Lb1 includes a user data area Ub1 and a system area Sb1. The first recording layer La2 includes a user data area Ua2 and a system area Sa2. The second recording layer Lb2 includes a user data area Ub2 and a system area Sb2. The first recording layer Lai includes a user data area Uai and a system area Sai. The second recording layer Lbi includes a user data area Ubi and a system area Sbi.

A track sandwiched between double dashed lines in the drawing, of the user data area Ua1 (first recording layer La1), is referred to as track Ta1. A track located on a side opposite to the track Ta1, of the user data area Ub1 (second recording layer Lb1), is referred to as track Tb1.

A track sandwiched between double dashed lines in the drawing, of the user data area Ua2 (first recording layer La2), is referred to as track Tc1. A track located on a side opposite to the track Tc1, of the user data area Ub2 (second recording layer Lb2), is referred to as track Td1.

A track sandwiched between double dashed lines in the drawing, of the user data area Uai (first recording layer Lai), is referred to as track Te1. A track located on a side opposite to the track Te1, of the user data area Ubi (second recording layer Lbi), is referred to as track Tf1.

In the present embodiment, the tracks Ta1, Tb1, Tc1, Td1, Te1, and Tf1 are located on the same cylinder.

The heads HD are opposed to the disks DK. In the present embodiment, one head HD is opposed to each recording layer L of the disk DK. For example, the head HD1 is opposed to the first recording layer La1 of the disk DK1, writes the data to the first recording layer La1, and reads the data from the first recording layer La1. The head HD2 is opposed to the second recording layer Lb1 of the disk DK1, writes the data to the second recording layer Lb1, and reads the data from the second recording layer Lb1.

The head HD3 is opposed to the first recording layer La2 of the disk DK2, writes the data to the first recording layer La2, and reads the data from the first recording layer La2. The head HD4 is opposed to the second recording layer Lb2 of the disk DK2, writes the data to the second recording layer Lb2, and reads the data from the second recording layer Lb2. The head HDj-1 is opposed to the first recording layer Lai of the disk DKi, writes the data to the first recording layer Lai, and reads the data from the first recording layer Lai. The head HDj is opposed to the second recording layer Lbi of the disk DKi, writes the data to the second recording layer Lbi, and reads the data from the second recording layer Lbi.

Figure 3:
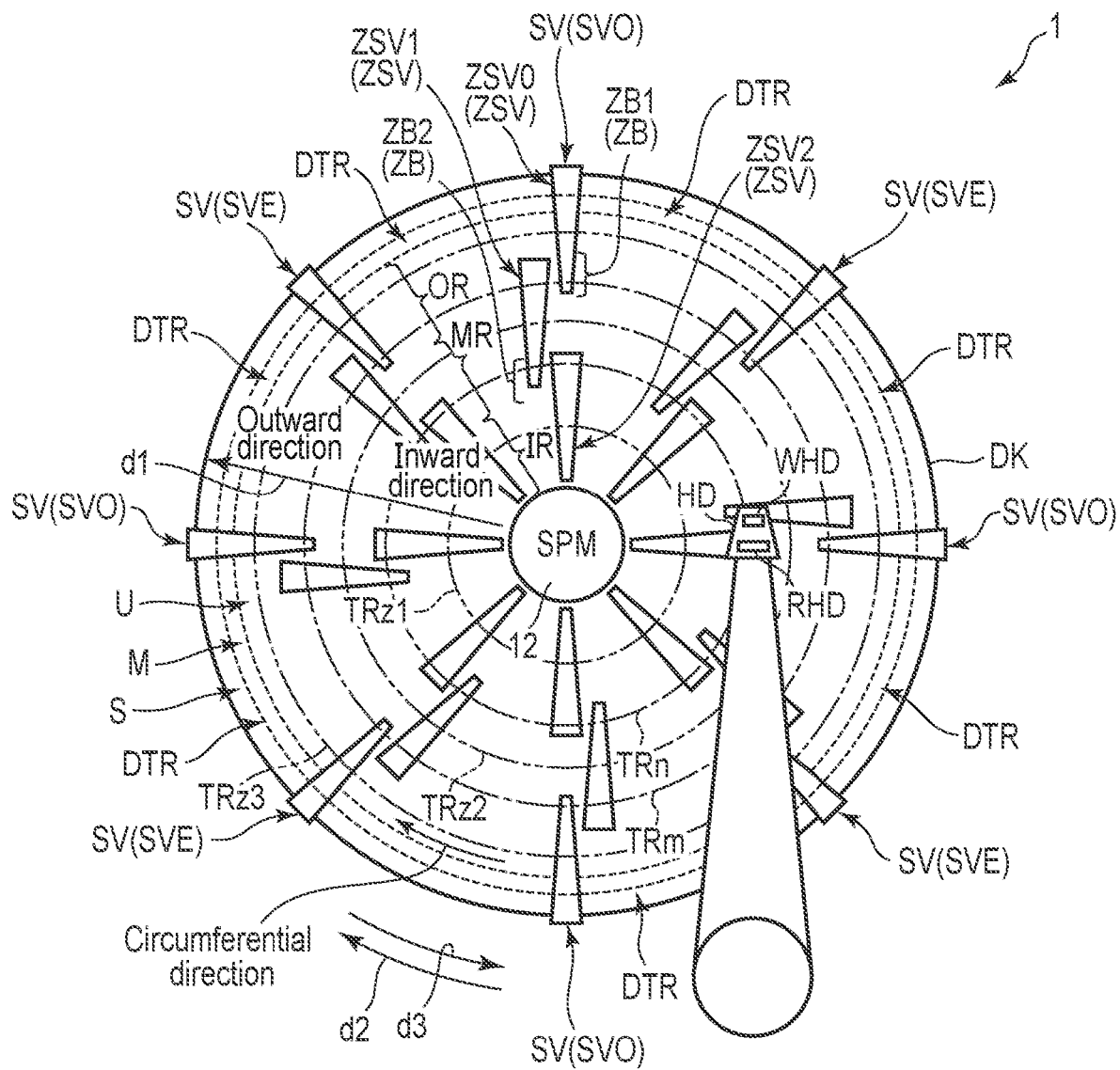
FIG. 3 is a schematic diagram showing an example of arrangement of a plurality of servo areas and a plurality of data areas on a single disk according to the embodiment.

FIG. 3 is a schematic diagram showing an example of arrangement of a plurality of servo areas SV and a plurality of data areas DTR on the single disk DK according to the present embodiment. As shown in FIG. 3, a direction toward the outer circumference of the disk DK in the radial direction d1 of the disk DK is referred to as an outward direction (outside), and a direction opposite to the outward direction is referred to as an inward direction (inside).

In FIG. 3, the user data area U is divided into an inner circumferential area IR located in the inward direction, an outer circumferential area OR located in the outward direction, and an intermediate area MR located between the inner circumferential area IR and the outer circumferential area OR.

The disk DK includes a plurality of servo areas SV and a plurality of data areas DTR. For example, the plurality of servo areas SV may extend radially in the radial direction of the disk DK and may be discretely arranged at predetermined intervals in the circumferential direction. For example, the plurality of servo areas SV may extend linearly from the inner circumference to the outer circumference and may be discretely arranged at predetermined intervals in the circumferential direction. For example, the plurality of servo areas SV may extend in a spiral shape from the inner circumference to the outer circumference and may be discretely arranged at predetermined intervals in the circumferential direction. Alternatively, for example, the plurality of servo areas SV may be arranged in an island shape in the radial direction and may be discretely arranged at different intervals in the circumferential direction.

In the following descriptions, one servo area SV on a particular track may be referred to as a "servo sector". Incidentally, the "servo area SV" may be referred to as a "servo sector SV". The servo sector includes servo data. The "arrangement of several servo data elements constituting the servo sector, or the like" may be referred to as a "servo pattern" in the following descriptions. Incidentally, the "servo data written to the servo sector" may be referred to as the "servo sector".

Each of a plurality of data areas DTR is arranged between a plurality of servo areas SV. For example, the data area DTR corresponds to the area between two continuous servo areas SV in the circumferential direction. One data area DTR on a predetermined track may be referred to as a "data sector" in the following descriptions. Incidentally, the "data area DTR" may also be referred to as a "data sector DTR". The data sector includes user data. Incidentally, the "user data written to the data sector" may also be referred to as the "data sector". The "data sector" may also be referred to as the "user data". In addition, a "pattern constituted by several data elements" may be referred to as a "data pattern". In the example shown in FIG. 3, the data pattern of a predetermined track is composed of a plurality of servo data elements (servo sectors) and a plurality of user data elements (data sectors).

The servo area SV includes a plurality of zone servo areas ZSV and the like. In addition to the zone servo areas ZSV, the servo area SV may include an area including a gap (i.e., a displacement between circumferential positions of two zone servo areas), an area including the servo data, the data area DTR, and the like. The plurality of zone servo areas ZSV are discretely arranged in the radial direction. Each of the plurality of zone servo areas ZSV extends in the radial direction.

One zone servo area (servo area) ZSV on a predetermined track may be referred to as a "zone servo sector" or a "servo sector". Incidentally, the "zone servo area (servo area) ZSV" may also be referred to as a "zone servo sector ZSV" or a "servo sector ZSV". The "servo data written to the zone servo sector" may be referred to as the "zone servo sector" or the "servo sector". The "arrangement of several servo data elements constituting the zone servo sector, or the like" may be referred to as the "zone servo pattern" or the "servo pattern" in the following descriptions. One servo area SV on a predetermined track may also be referred to as a "zone pattern sector" in the following descriptions.

Incidentally, the "servo area SV" may also be referred to as the "zone pattern sector". In addition, "at least one data element written to the zone pattern sector, or the like" may also be referred to as the "zone pattern sector". The zone pattern sector includes at least one zone servo sector. The "data pattern of the zone pattern sector" may be referred to as a "zone data pattern" in the following descriptions.

In the example shown in FIG. 3, the servo areas SV include zone servo areas ZSV0, ZSV1, and ZSV2. The zone servo areas ZSV0, ZSV1, and ZSV2 are arranged in a staggered pattern in the radial direction. The zone servo areas ZSV0, ZSV1, and ZSV2 may be arranged in a staircase pattern in the radial direction.

The zone servo area ZSV2 is located on an inner circumferential side than the zone servo area ZSV1. The zone servo area ZSV0 is located on an outer circumferential side than the zone servo area ZSV1. For example, the zone servo area ZSV2 is arranged from the inner circumferential area IR to the intermediate circumferential area MR, the zone servo area ZSV1 is arranged from the inner circumferential area IR to the outer circumferential area OR, and the zone servo area ZSV0 is arranged from the intermediate circumferential area MR to the outer circumferential area OR. In the following descriptions, a predetermined radial area in which the plurality of zone servo areas ZSV are arranged in the circumferential direction, in a predetermined servo area SV, may be referred to as a zone servo boundary area, double servo area or double zone servo area ZB.

In the example shown in FIG. 2, main servo areas SVO and sub-servo areas SVE are alternately arranged at intervals in the circumferential direction. For example, one sub-servo area SVE is arranged between two main servo areas SVO that are continuously arranged at an interval in the circumferential direction. In other words, one sub-servo area SVE is arranged between two main servo areas SVO that are continuously arranged at an interval in the circumferential direction. For example, when sequentially continuous numbers are assigned to all the servo areas SV of the disk DK, the main servo areas SVO correspond to the odd-numbered servo areas SV, and the sub-servo areas SVE correspond to the even-numbered servo areas SV. Incidentally, two or more sub-servo areas SVE may be arranged between two main servo areas SVO that are continuously arranged at an interval, in the circumferential direction.

The main servo areas SVO and the sub-servo areas SVE may be composed of, for example, only servo areas where the servo data is read and demodulated as a whole (hereinafter often referred to as normal servo areas). In the following descriptions, "reading and demodulating the servo data" may be referred to as "servo-reading". The main servo areas SVO and the sub-servo areas SVE may be composed of, for example, the normal servo areas, and servo areas (hereinafter often referred to as short servo areas) where servo-reading is performed in a smaller circumferential range of the servo data than a circumferential range of the servo data subjected to servo-reading in the normal servo areas.

A media cache M is allocated to the disk DK. However, the media cache M may not be arranged on the disk DK.

By using a plurality of servo data elements described above, it is possible to position the head HD such that a predetermined offtrack amount can be obtained, and to detect the amount and direction of shaking of the head HD.

In the present embodiment, the case in which the number of zones of the disk DK is three has been described, but the number of zones of the disk DK can be variously changed.

The number of zones of the disk DK may be thirty to forty. In addition, each zone includes a plurality of bands. For example, each zone includes several hundreds of bands.

Figure 4:
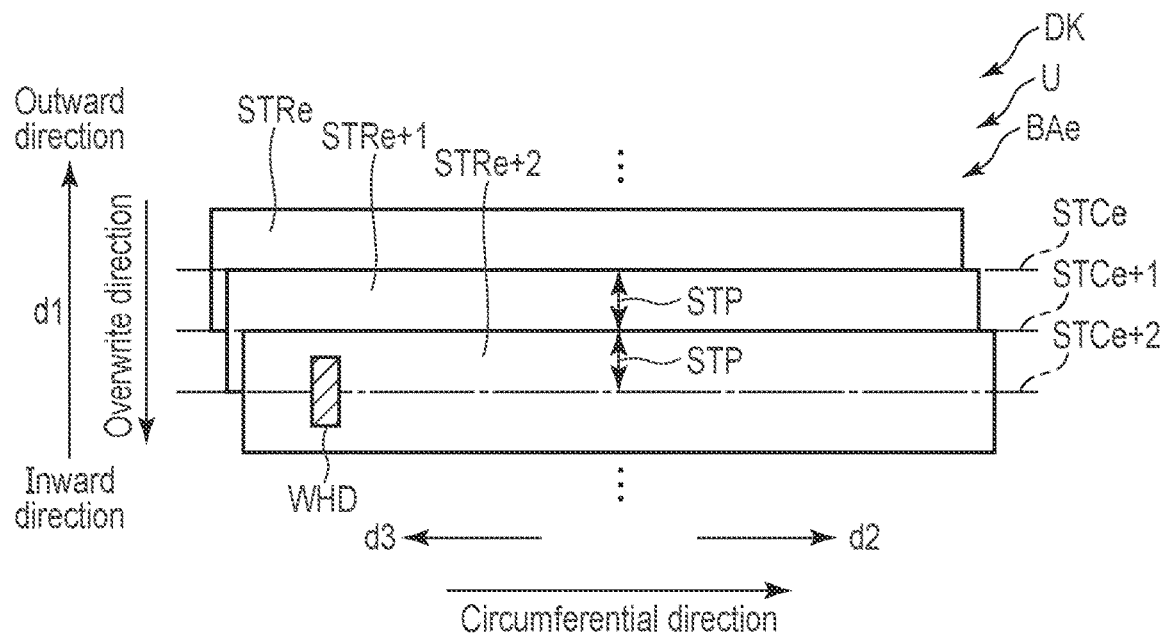
FIG. 4 is a schematic diagram showing three tracks in the user data area where shingled write magnetic recording processing of the disk shown in FIG. 3 is executed, together with a write head.

FIG. 4 is a schematic diagram showing three tracks STR of the user data area U where the shingled magnetic recording processing is performed for the disk DK shown in FIG. 3, and the write head WHD. The user data area U is a shingled magnetic recording area. Sequentially writing the data in band units within the user data area U is permitted, i.e., shingled magnetic recording is permitted.

As shown in FIG. 4, the write head WHD can sequentially write the data to the disk DK in the traveling direction d2. The read head RHD shown in FIG. 3 can also sequentially read the data written to the disk DK in the traveling direction d2.

In the direction parallel to the radial direction d1, the direction of sequentially performing the shingled magnetic recording for a plurality of tracks STR, i.e., the direction of making a track STR to which the data is be next written overlap with a track STR to which the data has been previously written, in the radial direction d1, is referred to as an overwrite direction or a recording progress direction. In a band BAe shown in FIG. 4, the overwrite direction is the inward direction, but the overwrite direction may be the outward direction.

For example, the overwrite direction applied to a plurality of bands BA (a plurality of zones Z) located on an outer circumferential side than a specific radial position and the overwrite direction applied to a plurality of bands BA (a plurality of zones Z) located on an inner circumferential side than the specific radial position may be opposite to each other.

The band BAe includes a plurality of tracks STR including tracks STRe, STRe+1, and STRe+2. The tracks STRe, STRe+1, and STRe+2 are continuously overwritten in the overwrite direction in the order of these descriptions. The track STRe among the tracks STRe, STRe+1, and STRe+2 corresponds to the track where data is first written, and the track STRe+2 corresponds to the track where data is last written.

The track STRe has a track center STCe at the center of the radial direction d1 when no other track is overwritten. The track STRe+1 has a track center STCe+1 at the center of the radial direction d1 when no other track is overwritten. The track STRe+2 has a track center STCe+2 at the center of the radial direction d1 when no other track is overwritten.

In the example shown in FIG. 4, the data is written to the tracks STRe, STRe+1, and STRe+2 at a pitch (shingled magnetic recording track pitch) STP. The track center STCe of the track STRe and the track center STCe+1 of the track STRe+1 are separated from each other at a pitch STP in the radial direction d1. The track center STCe+1 of the track STRe+1 and the track center STCe+2 of the track STRe+2 are separated from each other at a pitch STP in the radial direction d1. The data may be written to the tracks STRe to STRe+2 at different pitches.

A width in the radial direction d1 of the area of the track STRe where the track STRe+1 is not overwritten and a width in the radial direction d1 of the area of the track STRe+1 where the track STRe+2 is not overwritten are the same as each other. Incidentally, the width in the radial direction d1 of the area of the track STRe where the track STRe+1 is not overwritten and the width in the radial direction d1 of the area of the track STRe+1 where the track STRe+2 is not overwritten may be different from each other.

In FIG. 4, each track STR has a rectangular shape for convenience of descriptions but, in reality, each track STR is curved along the circumferential direction. In addition, each track STR may have a wave shape extending in the circumferential direction while varying in the radial direction d1. Incidentally, in FIG. 4, three tracks STR are overwritten, but more than three tracks STR may be overwritten.

The write processing unit 61a can perform the write processing by selecting the shingled magnetic recording of writing the data to a plurality of tracks STR overwritten in the radial direction d1 of the disk DK. In the example shown in FIG. 4, the write processing unit 61a sequentially performs the shingled magnetic recording on the tracks STRe to STRe+2 in the band BAe at the pitch STP in the inward direction (overwrite direction).

The write processing unit 61a writes the data to the track STRe+1 at the pitch STP in the inward direction of the track STRe and overwrites the track STRe+1 on an inner circumferential part of the track STRe. The write processing unit 61a writes the data to the track STRe+2 at the pitch STP in the inward direction of the track STRe+1 and overwrites the track STRe+2 on an inner circumferential part of the track STRe+1.

Figure 5:
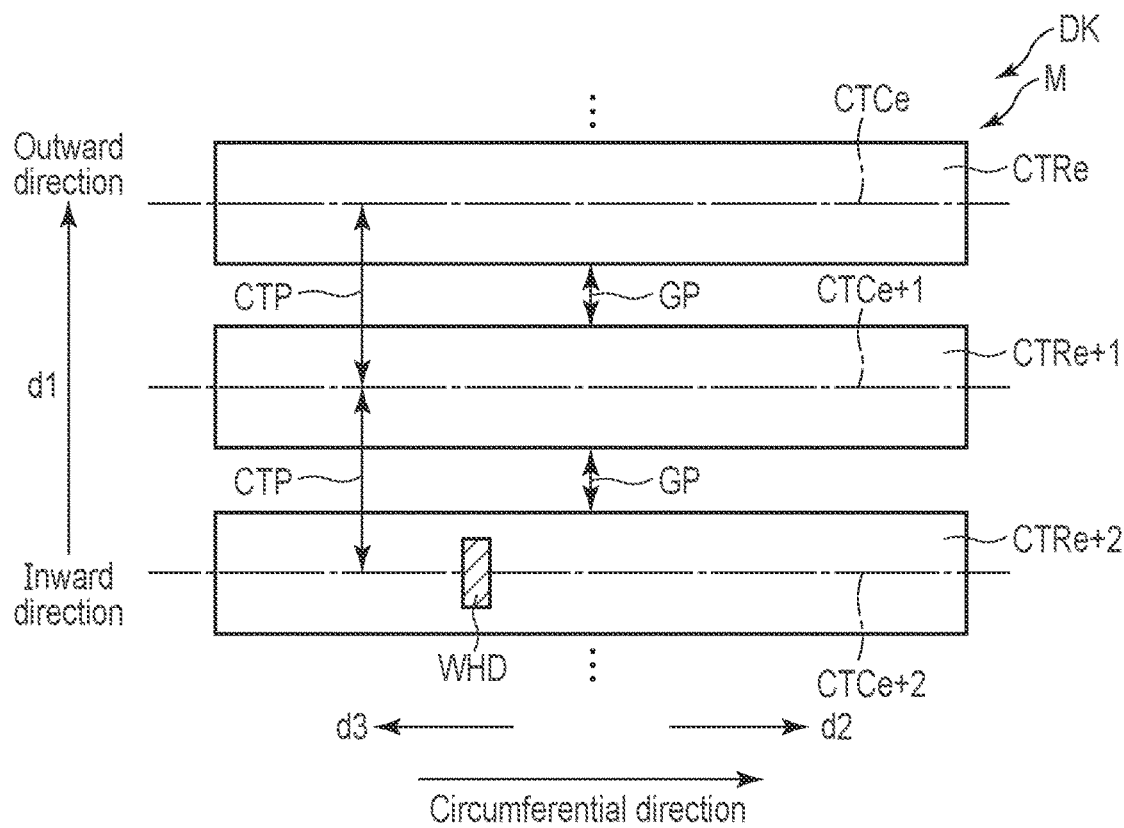
FIG. 5 is a schematic diagram showing three tracks of a media cache where conventional magnetic recording processing of the disk shown in FIG. 3 is executed, together with a write head.

FIG. 5 is a schematic diagram showing three tracks CTR of the media cache M where the conventional magnetic recording processing of the disk DK shown in FIG. 3 is performed, and the write head WHD. The media cache M and the system area S shown in FIG. 3 are the conventional magnetic recording areas. In the media cache M and the system area S, randomly writing the data is permitted, i.e., conventional magnetic recording is permitted.

As shown in FIG. 5, the media cache M includes a plurality of tracks CTR including tracks CTRe, CTRe+1, and CTRe+2. For example, widths (track widths) in the radial direction d1 of the tracks CTRe, CTRe+1, and CTRe+2 are the same as each other. Incidentally, the track widths of the tracks CTRe to CTRe+2 may be different from each other.

The track CTRe has a track center CTCe at the center of the radial direction d1, the track CTRe+1 has a track center CTCe+1 at the center of the radial direction d1, and the track CTRe+2 has a track center CTCe+2 at the center of the radial direction d1. In the example shown in FIG. 4, data is written to the tracks CTRe, CTRe+1, and CTRe+2 at a pitch (conventional magnetic recording track pitch) CTP. The track center CTCe of the track CTRe and the track center CTCe+1 of the track CTRe+1 are separated from each other at the pitch CTP. The track center CTCe+1 of the track CTRe+1 and the track center CTCe+2 of the track CTRe+2 are separated from each other at the pitch CTP.

The track CTRe and the track CTRe+1 are separated from each other at a gap GP. The track CTRe+1 and the track CTRe+2 are separated from each other at the gap GP. Incidentally, the data may be written to the tracks CTRe to CTRe+2 at different pitches. In FIG. 5, each track CTR has a rectangular shape for convenience of descriptions but, in reality, each track CTR is curved along the circumferential direction. In addition, each track CTR may have a wave shape extending in the circumferential direction while varying in the radial direction d1.

The write processing unit 61a can perform the write processing by selecting the conventional magnetic recording of writing the data to a plurality of tracks CTR spaced apart in the radial direction d1 of the disk DK. In the example shown in FIG. 4, the write processing unit 61a positions the write head WHD at the track center CTCe in a predetermined area of the disk DK and performs the conventional magnetic recording in a predetermined sector of the track CTRe or the track CTRe.

The write processing unit 61a positions the write head WHD at the track center CTCe+1, which is separated from the track center CTCe of the track CTRe in the inner direction by the pitch CTP, and performs the conventional magnetic recording in a predetermined sector of the track CTRe+1 or the track CTRe+1. The write processing unit 61a positions the write head WHD at the track center CTCe+2, which is separated from the track center CTCe+1 of the track CTRe+1 in the inner direction by the pitch CTP, and performs the conventional magnetic recording in a predetermined sector of the track CTRe+2 or the track CTRe+2.

The write processing unit 61a may sequentially perform the conventional magnetic recording in the tracks CTRe, CTRe+1, and CTRe+2, in a predetermined area of the disk DK, or randomly perform the conventional magnetic recording in a predetermined sector of the track CTRe, a predetermined sector of the track CTRe+1, and a predetermined sector of the track CTRe+2.

Figure 6:
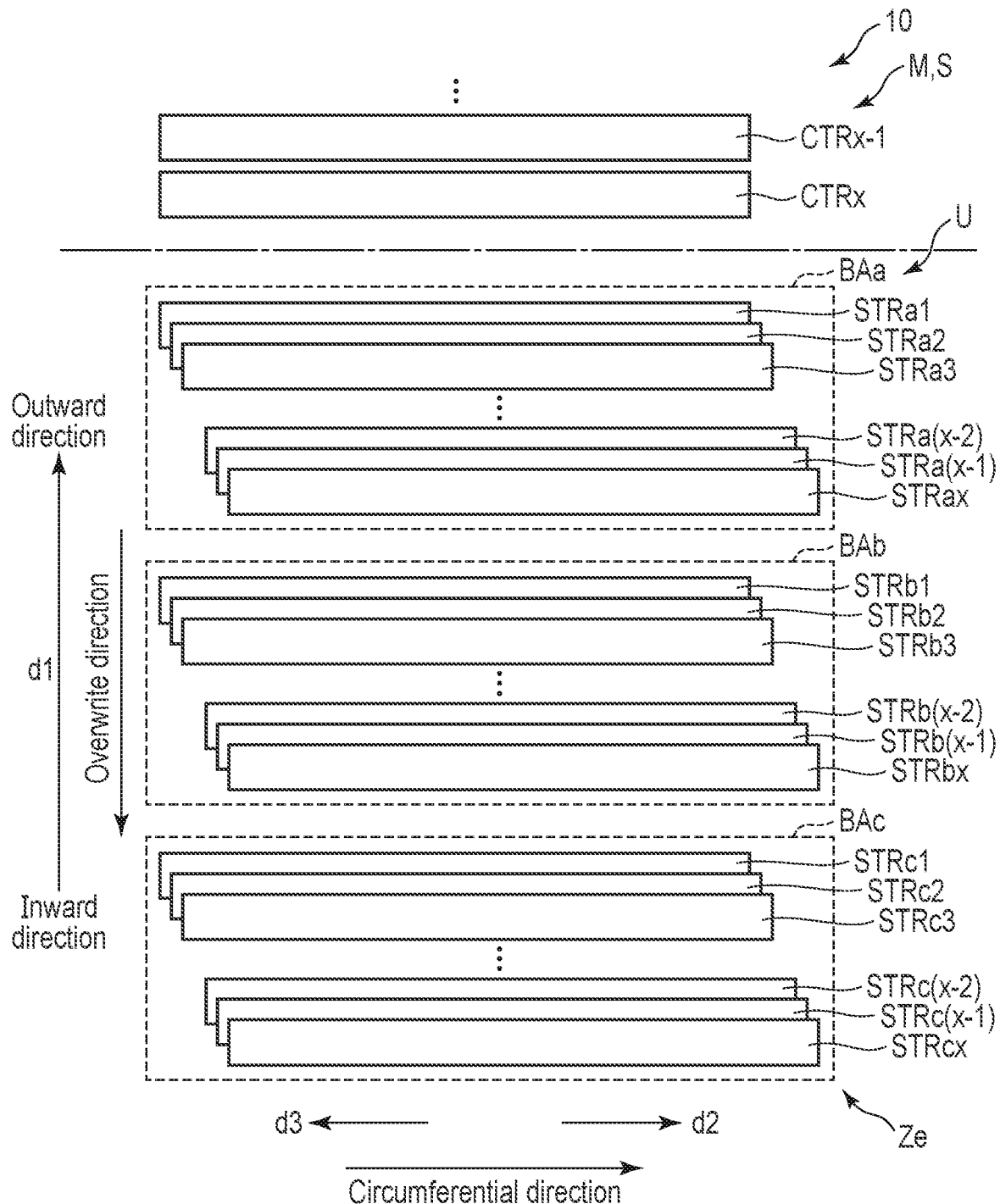
FIG. 6 is a schematic diagram showing an example of data write processing on the disk.

FIG. 6 is a schematic diagram showing an example of the data write processing on the disk DK. As shown in FIG. 6, the user data area U includes bands BAa, BAb, and BAc. The bands BAa, BAb, and BAc belong to the same zone Ze. In the zone Ze, the bands BAa, BAb, and BAc are intermittently arranged in the overwrite direction in the order of these descriptions.

The bands BAa and BAb are adjacent to each other in the radial direction d1, and the bands BAb and BAc are adjacent to each other in the radial direction d1.

The band BAa includes tracks STRa1, STRa2, STRa3, . . . , STRa(x-2), STRa (x-1), and STRax. The tracks STRa1 to STRax are subjected to the shingled magnetic recording in the overwrite direction in the order of these descriptions. In the band BAa, the track STRa1 corresponds to the first track where the data is first written, and the track STRax corresponds to the last track where the data is last written.

The band BAb includes tracks STRb1, STRb2, STRb3, . . . , STRb (x-2), STRb (x-1), and STRbx. The tracks STRb1 to STRbx are subjected to the shingled magnetic recording in the overwrite direction in the order of these descriptions. In the band BAb, the track STRb1 corresponds to the first track where the data is first written, and the track STRbx corresponds to the last track where the data is last written.

The band BAc includes tracks STRc1, STRc2, STRc3, . . . , STRc (x-2), STRc (x-1), and STRcx. The tracks STRc1 to STRcx are subjected to the shingled magnetic recording in the overwrite direction in the order of these descriptions. In the band BAc, the track STRc1 corresponds to the first track where the data is first written, and the track STRcx corresponds to the last track where the data is last written.

The number of the tracks STR included in each of the bands BA belonging to the same zone Z is the same. For example, the number of the tracks STR included in each of the bands BA belonging to the zone Ze is the same. In other words, the number of the tracks STR included in the band BA is fixed for each zone Z.

FIG. 6 shows tracks CTRx-1 and CTRX. In FIG. 6, the data is subjected to the conventional magnetic recording in the media cache M or the system area S, in the tracks CTRx-1 and CTRx. The tracks CTRx-1 and CTRx are adjacent to each other in the radial direction d1.

Figure 7:
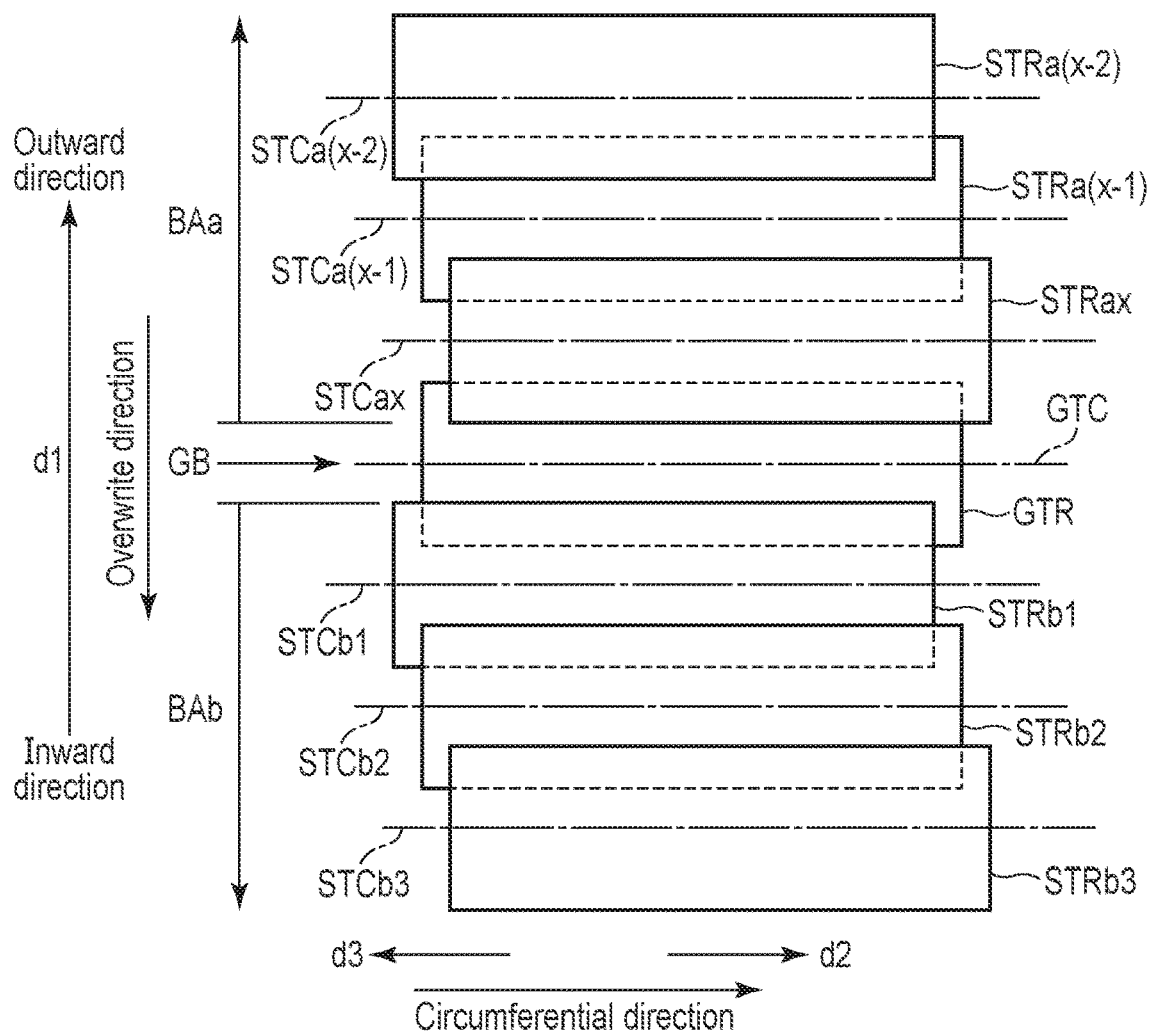
FIG. 7 is a schematic diagram showing two bands and one guard band of the user data area shown in FIG. 6.

FIG. 7 is a schematic diagram showing two bands BAa and BAb and one guard band GB of the user data area U shown in FIG. 6. As shown in FIG. 7, in the shingled magnetic recording, unlike the conventional magnetic recording, the MPU 60 manages a track group of the user data area U in units referred to as bands, with the feature of overwriting the data to a part of the track STR.

A guard band GB is generally provided between adjacent bands BA in the radial direction d1. The guard band GB includes a guard track GTR. Unlike the present embodiment, the guard band GB may include a plurality of guard tracks GTR. The guard band GB has a role of suppressing the interference between the adjacent bands BA. The shingled magnetic recording can be performed in a unit of one band BA by the guard band GB. In addition, the ranges (bands BA) where the data is sequentially written can be separated by the guard band GB.

For example, a track center STCa (x-2) of a track STRa (x-2), a track center STCa (x-1) of a track STRa (x-1), a track center STCax of a track STRax, a track center GTC of the guard track GTR, a track center STCb1 of a track STRb1, a track center STCb2 of a track STRb2, and a track center STCb3 of a track STRb3, are located at equal pitches in the radial direction d1.

The recording capacity of each band BA in the user data area U is usually predetermined based on the specifications required by the user except for the guard band GB in advance. The MPU 60 can record the same capacity of data in each of the bands BA. In general, the recording capacity of each band BA is 128 MiB or 256 MiB.

Figure 8:
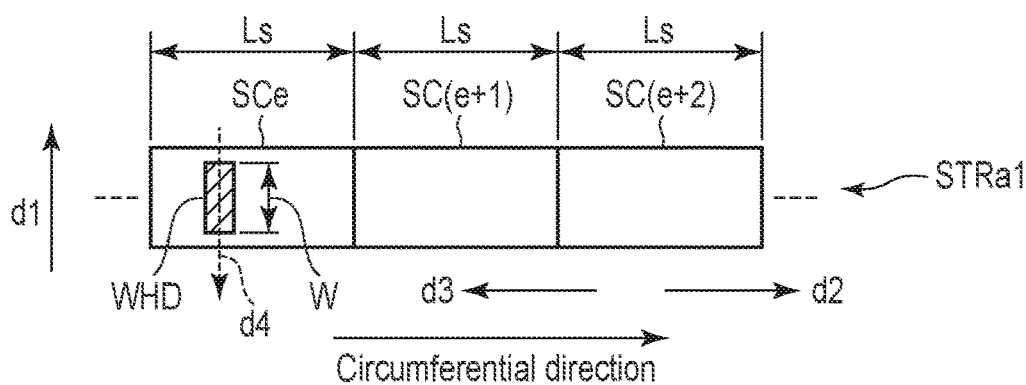
FIG. 8 is a schematic diagram showing three sectors of one track of the band shown in FIG. 6.

FIG. 8 is a schematic diagram showing three sectors SCe, SC (e+1), and SC (e+2) of one track STRa1 of the band BAa shown in FIG. 6. As shown in FIG. 8, each track STR includes a plurality of sectors SC. The track STRa1 includes a plurality of sectors SC including sectors SCe, SC (e+1), and SC (e+2). The number of the sectors SC included in each of the tracks STR belonging to the same zone Z is the same.

Each of the sectors SC has a length Ls in the circumferential direction of the disk DK.

The write head WHD has a width W in a seek direction d4. The width W of each write head WHD falls within a standard range. There are individual differences in the width W of the write heads WHD.

Next, a method of setting the band BA will be described.

Figure 9:
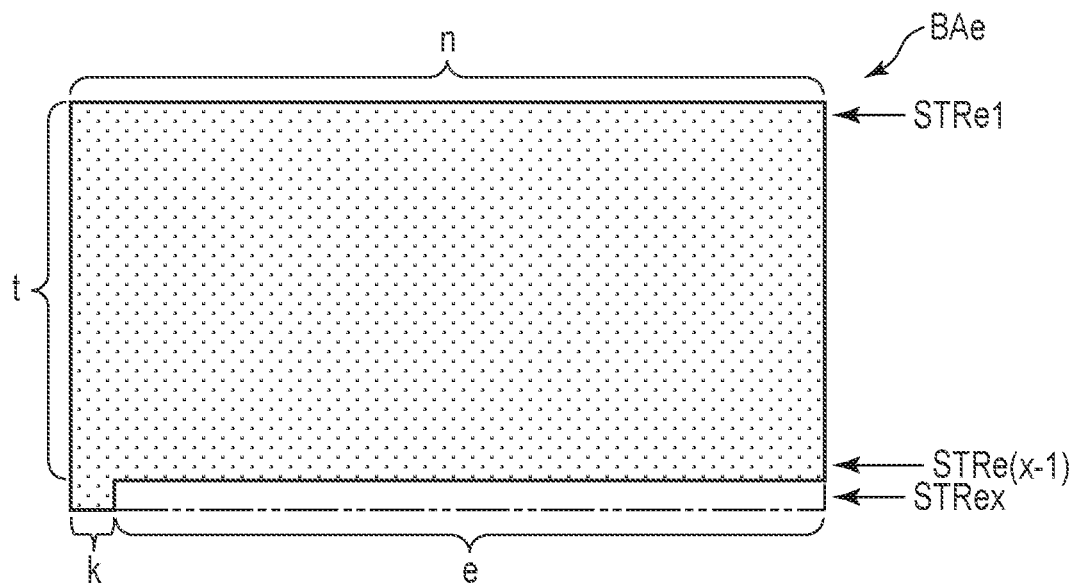
FIG. 9 is a schematic diagram showing one of the bands in the user data area of the disk according to a comparative example, illustrating an example in which an adjustment unit does not adjust the number of unused sectors in the band.

FIG. 9 is a schematic diagram showing the band BAe of the user data area U of the disk DK according to a comparative example, illustrating an example in which the adjustment unit 62 does not adjust the number of unused sectors in the band BAe. In FIG. 9, the band BAe has a rectangular shape but, in reality, the band BAe is curved along the circumferential direction.

As shown in FIG. 9, in the band BAe, the number of a plurality of sectors SC of each track STRe is denoted by n, the number of a plurality of tracks STRe is denoted by t+1, the number of unused sectors where no data is written, among a plurality of sectors SC of the band BAe, is denoted by e, and the difference obtained by subtracting e from n is denoted by k. In addition, the recording capacity of the band BAe is denoted by Cb, and the recording capacity of each sector SC is denoted by Cs.

The adjustment unit 62 obtains information on the recording capacity Cb, the recording capacity Cs, and the number n of sectors SC. The adjustment unit 62 can calculate information on liner recording density, which is the recording capacity per inch in the circumferential direction, from the recording capacity Cs and the number n of sectors SC. The liner recording density can be expressed in bit per inch (BPI).

Incidentally, the adjustment section 62 may obtain information on the liner recording density instead of the number n of sectors SC, and calculate the number n of sectors SC from the information on the recording capacity Cs and the liner recording density.

The number of tracks STRe per inch in the radial direction d1 is referred to as a track density. The track density can be expressed in track per inch (TPI).

The number of sectors SC in the band BAe necessary to obtain the recording capacity Cb is represented by Cb/Cs. When the number n of a plurality of sectors SC in one track STRe, i.e., BPI is determined, the respective values of t and k mentioned above can be calculated using the following Expression 1. A relationship among n, e, and k mentioned above can be expressed by the following Expression 2.

$$Cb/Cs = n \times t + k \qquad \text{(Expression 1)}$$

$$n = e + k \qquad \text{(Expression 2)}$$

The adjustment unit 62 can finalize the respective values of t, e, and k mentioned above, based on the information of the recording capacity Cb, the recording capacity Cs, and the number n of sectors SC. In FIG. 9, an area with dot patterns is an area where data of 128 MiB or 256 MiB is recorded by the shingled magnetic recording processing and an area to secure the recording capacity Cb. An area without dot patterns (blank area) is an unused area. In the shingled magnetic recording, unused areas (unused sectors) as shown in the drawing exist since the recording capacity Cb of each band is fixed.

In the example in FIG. 9, since the adjustment unit 62 does not adjust the number of unused sectors in the band BAe, the adjustment unit 62 sets n, t, k, and e mentioned above to the following numerical values, respectively, based on the determined BPI.

n=200
t=100
k=10
e=190 n>t and e≤t. It can be understood that in the example in FIG. 9, number larger than or equal to t of unused sectors exist in the band BAe. Since a number of unused sectors excessively exist in the band BAe, lowering the BPI of the band BAe is difficult.

Figure 10:
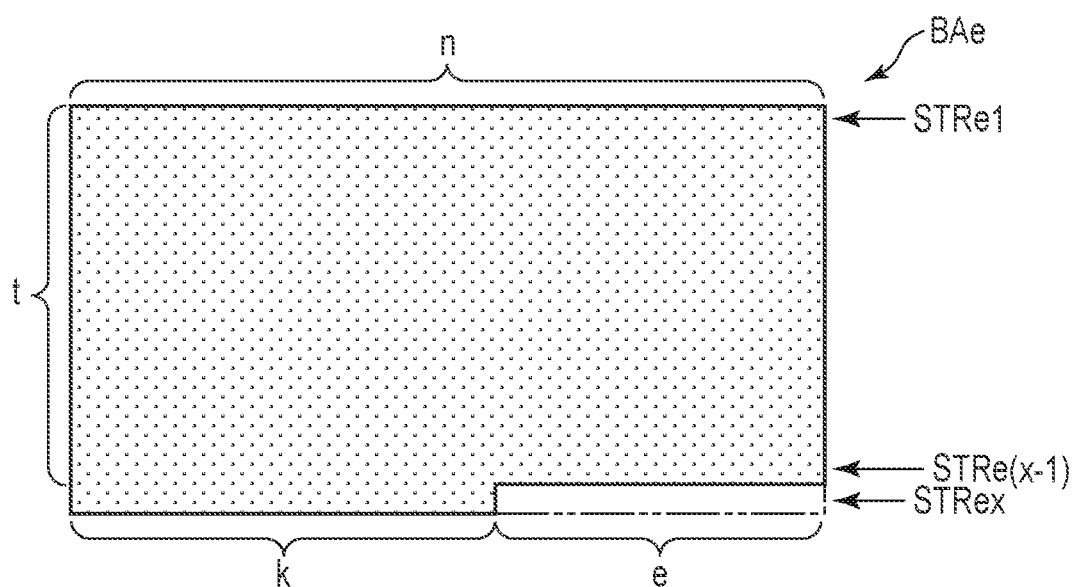
FIG. 10 is a schematic diagram showing one of the bands in the user data area of the disk according to the embodiment, illustrating an example in which an adjustment unit adjusts the number of unused sectors in the band.

FIG. 10 is a schematic diagram showing one band BAe of the user data area U of the disk DK according to the embodiment, illustrating an example in which the adjustment unit 62 adjusts the number of unused sectors in the band BAe. In FIG. 10, the band BAe has a rectangular shape but, in reality, the band BAe is curved along the circumferential direction. In FIG. 10, k mentioned above is a variable. In addition, in FIG. 10, similarly to FIG. 9, the area with dot patterns is the area where data of 128 MiB or 256 MiB is recorded by the shingled magnetic recording processing and a blank area is an unused area.

As shown in FIG. 10 and FIG. 1, the adjustment unit 62 can adjust each of first to fourth adjustment values. The first adjustment value is the number n of the plurality of sectors SC in each of the tracks STRe of the band BAe. The second adjustment value is a length Ls of each sector SC in the circumferential direction of the disk DK. The third adjustment value is the number t+1 of the plurality of tracks STRe of the band BAe. The fourth adjustment value is a frequency of the data to be written to the band BAe.

The write processing unit 61a can select the shingled magnetic recording and perform the write processing based on the above-described first to third adjustment values. The adjustment unit 62 can adjust the above-described first to third adjustment values to establish e≤t. In the present embodiment, the write processing unit 61a can select the shingled magnetic recording and perform the write processing based on the above-described first to fourth adjustment values. The adjustment unit 62 can adjust the above-described first to fourth adjustment values to establish e≥t.

It the example in FIG. 10, number larger than or equal to t of unused sectors do not exist in the band BAe. The number e of unused sectors in the band BAe can be reduced. Since the BPI of the band BAe can be lowered by reducing the above-mentioned e, the quality of the track STRe can be improved and the recording quality of the data on the track STRe can be improved.

The adjustment unit 62 can further adjust the above-described first to third adjustment values to establish n>t. In the present embodiment, the adjustment unit 62 can adjust the above-described first to fourth adjustment values to establish n>t. The adjustment unit 62 can establish e<t<n. The adjustment unit 62 can eliminate the relationship e<n≤t. For this reason, the adjustment unit 62 can desirably reduce the number e of unused sectors and can reduce the number of sectors SC of each track STRe.

By obtaining the information on the recording capacity Cb, the recording capacity Cs, and the number n of sectors SC, the adjustment unit 62 can finalize the numerical value of the above-mentioned t and tentatively determine the respective numerical values of the above-mentioned n, e, and k.

When the adjustment unit 62 determines that e<t originally as shown in FIG. 10 before the adjustment unit 62 adjusts the number of unused sectors in the band BAe, the adjustment unit 62 can finalize each of the above-mentioned n, e, and k without changing the numerical values.

In contrast, when the adjustment unit 62 determines that e≥t as shown in FIG. 9 before the adjustment unit 62 adjusts the number of unused sectors of the band BAe, the adjustment unit 62 can reduce the numerical value of the above-mentioned n, increase the numerical value of the above-mentioned k, and reduce the numerical value of the above-mentioned e, to establish e<t, and finalize each of the above-mentioned n, e, and k.

For example, when decreasing the numerical value of the above-mentioned n, increasing the numerical value of the above-mentioned k, and decreasing the numerical value of the above-mentioned e, the adjustment unit 62 can reduce the numerical value of the above-mentioned n by 1, increase the numerical value of the above-mentioned k by t, and reduce the numerical value of the above-mentioned e by t. In other words, the state of FIG. 9 can be changed to the state of FIG. 10.

As described above, in the example of FIG. 10, since the adjustment unit 62 adjusts the number of unused sectors of the band BAe, the adjustment unit 62 sets the above-mentioned n, t, k, and e to the following values, respectively.

n=199
t=100
k=110
e=89

Incidentally, the adjustment unit 62 does not make any adjustment to change the numerical value of the above-mentioned t. In addition, the adjustment unit 62 establishes 1≤e<t.

In addition, as the number n of sectors SC can be reduced, the adjustment section 62 can increase the length Ls of each sector SC and reduce the frequency of the data written to the band BAe. By establishing e<t, the BPI can be set to be lower and the recording quality can be improved.

Furthermore, the adjustment unit 62 can adjust the above-described first and second adjustment values, based on the characteristics of the write head WHD. The adjustment unit 62 can adjust the above-described first and second adjustment values to larger values, respectively, as the width W of the write head WHD is larger. In other words, as the width W is larger, the area of the write head WHD facing the disk DK becomes larger and the magnetic field applied to the disk DK becomes larger, and the recording quality can be thereby improved. As a result, as the width W is larger, the BPI can be made higher. Incidentally, an influence of the width W to the BPI is large, but an influence of the width W to the TPI is small. Based on the above, the adjustment unit 62 desirably adjusts the above-mentioned first to fourth adjustment values for each head zone (for each write head WHD and for each zone Z).

According to the magnetic disk device 1 according to the present embodiment constituted as described above, the magnetic disk device 1 comprises the disk DK, the write head WHD, the adjustment unit 62, and the write processing unit 61a. The capacity of the disk DK can be increased by employing the shingled magnetic recording. The shingled magnetic recording has a characteristic that the capacity of the band BAe is predetermined in advance. The recording capacity Cb of the band BAe in FIG. 9 and the recording capacity Cb of the band BAe in FIG. 10 are the same, for example, 256 MiB. From the viewpoint of the firmware, there is no difference between the recording capacity Cb of the band BAe in FIG. 9 and the recording capacity Cb of the band BAe in FIG. 10.

In contrast, the number of unused sectors in the band BAe in FIG. 9 and the number of unused sectors in the band BAe in FIG. 10 are significantly different from each other. As shown in FIG. 10, the number of unused sectors existing in the band BAe is reduced by the adjustment of the adjustment unit 62. Then, in the example in FIG. 10, since the BPI of the band BAe can be adjusted to be lower and the frequency of the data written to the band BAe can be lowered, the recording quality of the data in the band BAe can be improved.

Even if the BPI of the band BAe in FIG. 10 is made lower than BPI of the band BAe in FIG. 9, the recording capacities Cb of both the bands BAe are the same. Based on the above, the magnetic disk device 1 capable of attempting improvement of the quality of the data recorded on the disk DK while increasing the capacity of the disk DK can be obtained.

(Modified Example of the Embodiment)

Next, a modified example will be described. The magnetic disk device 1 is configured in the same manner as the magnetic disk device 1 of the above-described embodiment except for the configuration described in the modified example. When number t+1 of a plurality of tracks STRe of the band BAe is specified in advance, the adjustment unit 62 may adjust each of the first and second adjustment values and may not adjust the third adjustment value. The write processing unit 61a can select the shingled magnetic recording and perform the write processing based on the first and second adjustment values. The adjustment unit 62 can adjust the above-described first and second adjustment values to establish e≥t.

In the modified example, when number t+1 of a plurality of tracks STRe of the band BAe is specified in advance, the adjustment unit 62 may adjust each of the first, second, and fourth adjustment values. The write processing unit 61a can select the shingled magnetic recording and perform the write processing based on the first, second, and fourth adjustment values. The adjustment unit 62 can adjust the above-described first, second, and fourth adjustment values to establish ext.

By obtaining the information on the recording capacity Cb, the recording capacity Cs, and the above-mentioned t, the adjustment unit 62 can finalize the numerical value of each of the above-mentioned n, e, and k to establish ext.

In the modified example as well, the same advantages as those of the above-described embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above-described techniques are not limited to magnetic disk devices of hybrid recording type, but may be applied to magnetic disk device of shingled magnetic recording type.

Similarly to the above-described embodiment, the adjustment section 62 establishes $1 \leq e < t$, and sets the unused sectors in the band BA. Thus, even if a sector SC where writing the data is failed occurs while performing the write processing to the band BA in the shingled magnetic recording, unused sectors can be used as alternative sectors.

However, providing unused sectors in the band BA is not indispensable. Therefore, the adjustment unit 62 may establish $0 \leq e < t$. When $e=0$, the BPI of the band BA can be adjusted to the lowest value.

What is claimed is:

1. A magnetic disk device comprising:
a disk including a band including a plurality of tracks, each of the tracks including a plurality of sectors;
a write head writing data to the disk;
an adjustment unit adjusting each of a first adjustment value that is the number of the plurality of sectors in each of the tracks of the band, a second adjustment value that is a length of each of the sectors in a circumferential direction of the disk, and a third adjustment value that is the number of the plurality of tracks of the band; and
a write processing unit capable of selecting shingled magnetic recording processing of overwriting data to the plurality of tracks in a radial direction of the disk and performing write processing based on the first to third adjustment values,
wherein
when the number of the plurality of tracks of the band is t+1 and the number of unused sectors among the plurality of sectors of the band is e, the adjustment unit adjusts the first to third adjustment values to establish ext.

2. The magnetic disk device of claim 1, wherein the adjustment unit further adjusts the first to third adjustment values to establish n>t when the number of the plurality of sectors in each of the tracks of the band is n.

3. The magnetic disk device of claim 2, wherein when a recording capacity of the band is Cb, a recording capacity of each of the sectors is Cs, and a variable is k,
Cb/Cs=n×t+k, and
n=e+k, and
the adjustment unit obtains information on the Cb, the Cs, and the n, finalizes the t, and tentatively determines each of the n, the e, and the k,
finalizes the n, the e, and the k without changing numerical values of the n, the e, and the k, respectively, when determining that e<t, and makes the numerical value of the n smaller, makes the numerical value of the k larger, makes the numerical value of the e smaller, and finalizes each of the n, the e, and the k to establish e<t when determining that e≥t.

4. The magnetic disk device of claim 3, wherein
when determining that e≥t, the adjustment unit makes the numerical value of the n smaller by 1, makes the numerical value of the k larger by t, and makes the numerical value of the e smaller by t.

5. The magnetic disk device of claim 4, wherein
when determining that e≥t, the adjustment unit increases a length of each of the sectors and lowers a frequency of the data to be written to the band.

6. The magnetic disk device of claim 3, wherein
when determining that e≥t, the adjustment unit increases a length of each of the sectors and lowers a frequency of the data to be written to the band.

7. The magnetic disk device of claim 1, wherein
the adjustment unit further adjusts a fourth adjustment value that is a frequency of the data,
the write processing unit is capable of selecting the shingled magnetic recording and performing the write processing based on the first to fourth adjustment values, and
the adjustment unit adjusts the first to fourth adjustment values to establish ext.

8. The magnetic disk device of claim 1, wherein
the adjustment unit is capable of adjusting the first and second adjustment values based on a characteristic of the write head, and adjusting the first and second adjustment values to be larger values as a width of the write head in a seek direction is larger.

9. The magnetic disk device of claim 1, wherein
the adjustment unit establishes $1 \leq e < t$.

* * * * *